United States Patent [19]

Herczog

[11] 4,375,503

[45] Mar. 1, 1983

[54] SODIUM ION CONDUCTING GLASSES AND BATTERIES EMBODYING GLASSES

[75] Inventor: Andrew Herczog, Hammondsport, N.Y.

[73] Assignee: Corning Glass Works, Corning, N.Y.

[21] Appl. No.: 317,941

[22] Filed: Nov. 4, 1981

[51] Int. Cl.³ .......................................... H01M 10/39
[52] U.S. Cl. .................................... 429/104; 429/193; 501/66
[58] Field of Search ...................... 429/104, 193, 191; 204/195 G, 195 S; 501/66

[56] References Cited

U.S. PATENT DOCUMENTS

| | | | |
|---|---|---|---|
| 4,069,372 | 1/1978 | Voinov | 429/193 |
| 4,190,500 | 2/1980 | Booth | 429/193 |
| 4,237,196 | 12/1980 | Gutmann et al. | 429/104 |

Primary Examiner—Donald L. Walton
Attorney, Agent, or Firm—Clinton S. Janes, Jr.

[57] ABSTRACT

Sodium ion conducting glasses are disclosed that have a resistivity not over $10^5$ ohm cm. at 300°, are resistant to corrosive attack by liquid sodium, resist devitrification, are resistant to moisture, and are composed essentially of soda, alumina, silica, and boric oxide. The glasses are particularly useful in forming membranes to separate electrolytes in electrochemical cells such as the sodium-sulfur battery.

9 Claims, 1 Drawing Figure

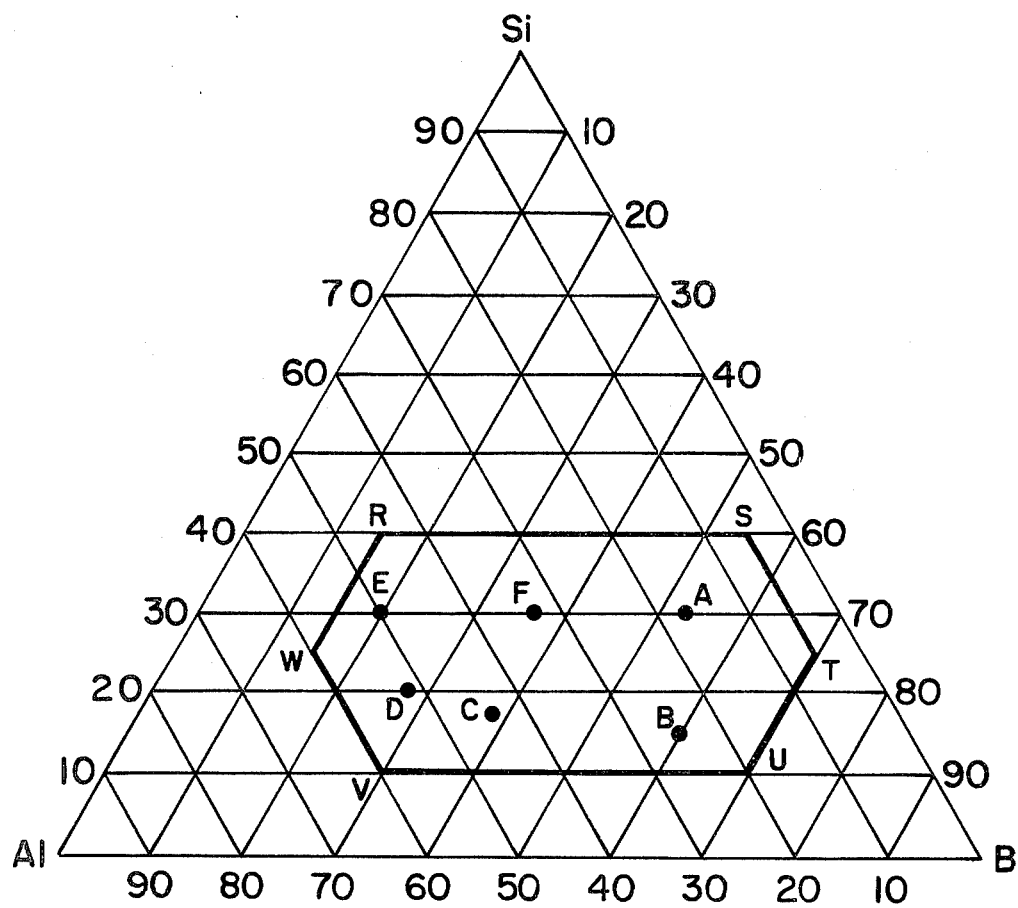

SODIUM ION CONDUCTING GLASSES AND BATTERIES EMBODYING GLASSES

BACKGROUND OF THE INVENTION

The invention is concerned with glasses having a high conductivity for sodium ions. It is especially concerned with glasses of this nature having other characteristics that adapt them to use as solid electrolytes in electrochemical cells.

An application of particular interest is the alkali metal-sulfur battery as exemplified in U.S. Pat. Nos. 3,404,035 and 3,476,602. A variety of designs and materials has been proposed for this type battery. Thus far, however, the sodium-sulfur version appears to have generated major interest.

Typically, the sodium-sulfur battery utilizes a liquid sodium anode, a liquid mixture of sulfur and sodium sulfide (e.g., a sodium polysulfide) as a cathode, and a sodium ion conductive glass as an electrolyte-separator or membrane. This membrane separates the anodic and cathodic liquids, and is permeable to sodium ions.

The membrane may take various shapes that provide suitable sodium ion transfer, while keeping the liquid anode and cathode materials separated. Suitable membrane shapes include flat plates, corrugated sheets, spirals, and hollow fibers. Maximum efficiency and energy density have been secured by making the membrane (electrolyte-separator) very thin in cross-section.

Both ceramic and vitreous materials have been proposed for use in producing electrolyte separators. Beta-alumina, as such or modified, has been used quite widely. In the field of glasses, it has been proposed to use silicate, borate, borosilicate, boroaluminate, and borophosphate systems. All of these have failed to prove adequate in one or more respects.

A glass membrane, useful for separating the anodic and cathodic liquids in a sodium-sulfur battery, must satisfy two very basic requirements. First and foremost, the glass must provide a sufficiently high sodium ion conductivity at a temperature of 300° C., a typical operating temperature for such a battery. For this reason, the glass must have a resistivity of $10^5$ ohm-cm or less, corresponding to a sufficiently high conductivity, at that temperature.

In addition to the glass resistivity being low, it must remain relatively stable during the life of a battery in order to maintain a stable conductivity. To this end, the glass must be resistant to corrosion, and non-reactive with the contacting liquids, during the operational life of the battery.

Many of the glasses previously proposed in the literature have sufficiently low resistivities, but only a few provide any reasonable degree of corrosion stability. Among these are the sodium borate glasses described in U.S. Pat. No. 3,829,331 (Tsang) and the aluminoborate glasses disclosed in U.S. Pat. No. 4,190,500 (Booth).

In addition to the two basic considerations of electrical conductivity and stability, there are several other factors to be considered in selecting or developing a glass for use as a membrane in a sodium-sulfur battery. These include: (1) viscosity-temperature characteristics, (2) resistance to devitrification, (3) resistance to atmospheric attack, and (4) structural stability at an elevated temperature. Their relative importance depends on the design, mode of operation and process of production for the battery.

The viscosity-temperature characteristics of a glass must be so controlled as to provide an annealing point that is compatible with formation of an effective seal with a sealing glass. This requirement is discussed in detail in my pending application Ser. No. 195,377 filed Oct. 9, 1980 now U.S. Pat. No. 4,311,772. Thus, the membrane glass may be required to withstand the elevated temperature necessary to melt a sealing glass. Alternatively, if an ion exchange sealing process is employed, it must withstand the temperature at which exchange is effected. Both the sodium borate and sodium aluminoborate glasses tend to be marginally useful in this respect.

The membrane glass must resist devitrification sufficiently to permit the initial forming operation, as well as avoid any crystallization during sealing. The development of uncontrolled crystallization (devitrification) creates random stresses that tend to weaken the glass and cause fracture. By way of example, a glass that does not devitrify, when cooled at a 2°/minute rate from its melting temperature, is usually considered adequate for drawing of tubing such as used in battery electrolyte separators. Aluminoborate glasses, that have low resistivity due to a high soda content, tend to devitrify easily, and thus fail to meet this requirement.

Resistance to atmospheric corrosion or attack is vital in order to prevent surface deterioration which results in loss of mechanical strength as well as in variations of electrical characteristics. The usual problem is moisture attack. Both sodium borates and sodium aluminoborates tend to have poor weathering characteristics, thus failing to meet this requirement.

As noted earlier, a sodium-sulfur battery operates at about 300° C. The membrane must remain structurally and chemically stable at this temperature. Structural change can lead to viscous deformation, or to stresses which result in fracture and change in conductivity. Chemical change may be a result of reaction with water vapor or impurities in the battery chemicals. In either case, glass properties may vary unpredictably. Both sodium borate and sodium aluminoborate glasses are deficient in this respect, but the former are particularly susceptible.

PURPOSE OF THE INVENTION

The basic purpose of the invention is to provide a novel and useful family of sodium ion conducting glasses. A further purpose is to provide such glasses having a combination of properties that render them particularly suitable for a variety of devices or processes involving sodium ion transfer in electrochemical cells. Another purpose is to provide new and improved sodium-sulfur batteries. A still further purpose is to provide improved glass electrolyte-separators for such batteries. Another purpose is to provide glass electrolyte-separators that are resistant to corrosive and erosive attack by the molten liquid materials in such batteries. Still another purpose is to provide sodium ion conducting glasses having viscosity-temperature characteristics that permit assembly with sealing glasses. An important purpose is to provide glasses having good resistance to weathering, in particular moisture attack. It is also a purpose of the invention to provide glasses that resist devitrification and other detrimental changes whereby the glasses may be readily fabricated in the form of thin-walled tubes, tubular fibers, or thin foils. Other purposes will become evident from the ensuing description.

SUMMARY OF THE INVENTION

In terms of a novel glass, the invention is a sodium ion conducting glass composed essentially of, as calculated from the glass batch in cation percent, 32–44% Na, and the remainder (56–68%) a combination of Si, B and Al wherein the Si content is 10–40%, preferably 12–33%, of the total Si+B+Al content, the Al is 5–60% of such total, and the B is 15–70% thereof. Other constituents, if present at all, constitute no more than about 5% of the glass.

In terms of a sodium-sulfur battery operated at 300° C. or thereabout, the invention is a battery having a liquid sodium anode, a liquid sulfur-sodium sulfide mixture as a cathode, and a thin glass membrane separating the anode and cathode liquids, the membrane glass being composed essentially of, as calculated from the glass batch in cation percent, 32–44% Na, and the remainder (56–68%) a combination of Si, B and Al wherein the Si content is 10–40%, preferably 12–33%, of the total Si+B+Al content, the Al is 5–60% of such total content, and the B is 15–70% thereof.

PRIOR DISCLOSURES

U.S. Pat. Nos. 3,404,035 (Kummer et al.) and 3,476,602 (Brown et al.) have been mentioned previously. Each discloses a sodium-sulfur battery construction embodying a molten sodium anode, a sodium sulfide cathode, and a separating membrane which may be a silicate glass.

The Kummer et al. patent teaches that sodium aluminosilicate glasses having molar proportions of 1:1:3–6 are attacked by sodium, and recommends sodium aluminosilicates and sodium aluminoborates with relatively high soda and silica or borate levels. The Brown et al. patent employs hollow or tubular fibers of 20–1000 microns diameter as the separator, and shows use of soda-alumina, soda-lime and soda silicate glasses.

U.S. Pat. No. 3,663,294 (Levine et al.) discloses sodium borosilicate separators and control of hydroxide level in the sodium polysulfide catholyte to reduce glass attack.

U.S. Pat. No. 3,829,331 (Tsang) discloses use of sodium borate-sodium halide glasses for membrane production.

U.S. Pat. No. 4,132,820 (Mitoff) discloses a sodium beta-alumina junction flange for a separator wherein the flange is coated with a $Na_2O-RO-Al_2O_3-B_2O_3$ glass which may contain minor amounts of $P_2O_5$ and $SiO_2$, and which matches the beta-alumina expansion coefficient.

U.S. Pat. No. 4,268,313 (Park et al.) discloses a $Na_2O.CaO.SrO.BaO.Al_2O_3.B_2O_3.SiO_2$ sealing glass adapted to sealing together alpha- and beta-alumina parts in a sodium-sulfur battery.

U.S. Pat. No. 4,190,500 (Booth) discloses producing a membrane separator from a sodium aluminoborate glass which may contain minor amounts of additives including silica.

U.S. Pat. Nos. 4,181,579 (Booth) and 4,206,016 (Booth) disclose use of sodium aluminophosphate and sodium borophosphate glasses for producing separators.

U.S. Pat. No. 4,237,196 (Gütmann et al.) discloses electrolyte separator glasses having the composition $xNa_2O.ySiO_2.zAl_2O_3$, where x/y is 0.52 to 0.92 and x/z is 2 to 20.

U.S. Pat. No. 2,570,878 (Stanworth et al.) discloses $Li_2O.Al_2O_3.B_2O_3.SiO_2$ glasses which have thermal coefficients of expansion similar to normal soda-lime glasses, but higher electrical conductivity.

U.S. Pat. No. 3,764,354 (Ritze et al.) discloses fluoride borosilicate glasses which contain 5–18% $Al_2O_3$ and 8–20% alkali oxide plus alkali fluoride. The glasses are described as having optical properties making them useful in optical instruments exposed to large temperature changes.

BRIEF DESCRIPTION OF THE DRAWING

The FIGURE appended to this specification is a B-Al-Si ternary diagram in which the polygon RSTUVW represents the proportions of the network forming cations in glasses of the invention at any given soda level between 32 and 44% Na.

DESCRIPTION OF THE INVENTION

The invention is predicated on discovery of a family of glasses having properties particularly favorable for producing electrolyte separators as used in sodium-sulfur batteries. It will be appreciated that the glasses, and membrane type separators produced therefrom, may prove equally useful in other electrochemical devices. Particular reference is made to electrochemical cells involving sodium ion transfer, e.g., cells used in sodium separation and/or purification.

The membranes can take various forms, such as flat plates, corrugated sheets, spirals, and the like, which, during operation, permit sodium ion transfer, while maintaining anode and cathode materials otherwise separated. A preferred form of membrane is fine, hollow, glass fibers such as disclosed by Brown et al. (#3,476,602) and Booth (#4,190,500), for example. In general, fibers no greater than a millimeter in outside diameter, and having a wall thickness less than 0.1 mm, are preferred. In a sodium-sulfur battery described in the Brown patent, the hollow tubular fibers are filled with liquid sodium metal. Large numbers of such capillary type tubes may be bundled in desired geometric design and sealed into a common header by a sealing glass or other sealing means.

My copending application, Ser. No. 195,377 filed Oct. 9, 1980, describes in detail some of the problems encountered in sealing capillary tubes into a header, and discloses an improved sealing procedure. Specifically, that application discloses alkali metal borate sealing glasses wherein up to half the boric oxide may be replaced by alumina, and where the alkali metal is potassium, rubidium, cesium, or mixtures. These glasses are sealed to capillary tubes composed of glasses having compositions in the sodium or potassium borate systems. The seal is formed at a low temperature by exchanging one alkali metal ion from the sealing glass with another alkali metal ion from the capillary glass.

It was noted earlier that a very basic requirement is a resistivity of $10^5$ ohm-cm or less at the operating temperature of the battery to provide the necessary sodium ion conductivity. Sodium content in the present glasses is mainly responsible for meeting this requirement. Other modifiers, that is non-network constituents such as other single or double charged cations, cannot be used to advantage. For practical purposes then, they may be disregarded.

It is recognized that, in a silicate type glass, conductivity increases with soda content. However, with increasing soda content, glass stability decreases, and the glass becomes increasingly difficult to fabricate and assemble. Hence, soda content is desirably as high as can be tolerated by other factors.

Of particular concern is the fact that the number of non-bridging oxygen ions increases with increasing soda content. Consequently, there is a greater tendency for devitrification to occur. The amount of soda required for an optimum balance between conductivity and stability depends in some measure on the network forming system, or type of glass. Thus, a higher soda content may usually be tolerated in silicates and aluminosilicates than in borates and borosilicates.

The optimum soda content in a given glass is easily determined by melting a series of glasses with stepped increases in soda content, and observing the devitrification tendencies of the glasses. Thus, provision may be made for cooling each glass from the molten state at a preset rate of 2° C./minute while measuring glass viscosity by the rotating cylinder method. Observation of devitrification by the viscosity measuring equipment can be used to determine the permissible soda level.

Soda content also affects other properties. Thus, as the soda level increases in an otherwise constant glass network, the viscosity decreases and the coefficient of thermal expansion increases. These properties can also be controlled to some extent by adjustment of the network forming oxides as discussed subsequently. In general, the soda content of the present glasses should be at least 32 cation percent to provide sufficient conductivity, but should not exceed 44% in the interest of glass stability and other factors.

Further composition discussion is limited to the network forming oxides in terms of cation relationships in the Si-Al-B ternary system. This is possible because of (1) the narrow range of sodium concentrations permitted, (2) the predictability of property behavior as a function of sodium content, and (3) the essential absence of other modifiers in significant amount.

It is recognized that glasses exist in the form of oxide mixtures. However, the present glasses are defined and described in terms of the cations silicon, boron, aluminum and sodium because of the dominant significance of these ions and their relationship for present purposes. The cation relationships could also be expressed equivalently as mole relationships of oxides, but the single ion form of the oxide would be used, thus, $NaO_{0.5}$, $BO_{1.5}$, $AlO_{1.5}$ and $SiO_2$. For further comparison, the specific examples are shown in weight percent as well as cation percent.

The accompanying FIGURE is a ternary diagram with Si represented at the apex, Al at the left hand end of the base line and B at the right hand end. The area enclosed within polygon RSTUVW represents glasses in accordance with the present invention.

It will be appreciated that the absolute values for the cations Si, Al and B, in any given relationship to each other, will vary with sodium content. Thus, a true composition illustration would require a three-dimensional body, corresponding to the polygon in cross-section, but having an axis extending normal to the drawing, to represent sodium content. Put in other terms, the present FIGURE represents all data in the base plane of such three-dimensional figure independent of the sodium level.

Each point on the diagram then represents a series of glasses of varying soda content equivalent to 32–44 cation percent sodium. Therefore, if sodium is expressed as X in cation percent, the absolute cation percent of Si, or Al, or B is expressed as $Nc(100-X)/100$ where Nc are the values shown in the diagram for the network cations. For example, if a sodium ion content of 40 cation % is assumed, and the value of Al is taken as 30% from the diagram, then the actual or absolute value of Al is 0.6×30% or 18 cation percent Al.

The present glasses require silica in connection with soda in providing low resistivity. Silica also functions to enhance glass viscosity and stability, especially when the soda content is high. High silica glasses, however, are attacked by metallic sodium when used in lamps, and a similar attack occurs in a battery. Hence, the amount of silica that can be used is limited.

It is known that some degree of silica can be present in glasses which are resistant to sodium corrosion. Thus, various borate and aluminate glasses, that are resistant to corrosion, are known to contain some silica. Literature on this subject is reviewed by Brinker and Klein in an article at pages 142–5 of Vol. 21, No. 4, *Physics and Chemistry of Glasses*, (1980). However, there appears to have been no effort to rationalize these facts or to determine a maximum permissible amount.

On the basis of known data and assumed corrosion mechanisms, one may conclude that:

(a) glasses having a high silica content contain Si-O-Si bonds which undergo corrosion due to a reduction reaction in which the oxygen linking the silicon reacts with sodium.

(b) borate and aluminate glasses contain, respectively, B-O-B and Al-O-Al linkages wherein the oxygen is not subject to sodium reaction.

(c) borate and aluminate glasses, which are corrosion resistant in spite of the presence of a minor amount of silica, contain a shared linkage between Si and B or Al ions, such as Si-O-B or Si-O-Al, which is also stable against corrosion.

Accepting the foregoing supposition, corrosion resistance can be related to the amount of silicon that can be present in a glass system, based on boron and/or aluminum network ions, before two silicon atoms start to share the same oxygen ion, that is form an Si-O-Si linkage.

Assuming an energetically stable glass structure where alternate ordering is favored, a ratio of $Si/(Al+B) = \frac{3}{4}$ could be tolerated. This is the case because, in aluminoborosilicate glasses of high soda content, silicon and aluminum ions are fourfold coordinated and boron ions are mostly threefold coordinated. However, even a low concentration of Si-O-Si linkage, such as might occur, is detrimental. To minimize the chance of this occurring then, the ratio of Si/(B+Al) ions is limited to $\frac{2}{3}$ (40% Si in the total Si+B+Al) and preferably $\frac{1}{2}$ (33.33% Si in the Si+B+Al total).

The lower limit on silicon content in the silica-alumina-boric oxide network former system is about 10 cation %, that is a Si/(B+Al) ratio of about 1/9. Glasses with lesser silicon contents have too low viscosity values, and are highly sensitive to attack from moisture in the atmosphere. Also, the permissible soda content is related to the silica content, as noted earlier, and must be restricted in order that the glass be resistant to devitrification. With low silica then, the soda content becomes too small to provide high conductivity in the glass.

With silicon taking 40%, preferably 33.3% or less, of network sites, the remaining sites must be occupied by boron and/or aluminum ions. As indicated above, this is necessary to avoid Si-O-Si linkages which are subject to corrosive attack by sodium.

Aluminum in the glass structure is associated with four oxygen atoms, thus forming groups of tetrahedral coordination $(AlO_4)^-$. One of the oxygens comes from sodium oxide, with the sodium ion occupying a relatively mobile position nearby. In this manner, aluminum contributes to sodium conductivity and enhances glass viscosity.

The presence of aluminum also stabilizes sodium borosilicate glasses against phase separation and structural rearrangements which result in viscosity changes with time. An aluminum content of at least 5% of the network forming cations (about 3 cation percent of the glass) is considered the minimum effective amount. If the aluminum content exceeds the sodium content, $(AlO_4)^-$ groups become unstable. Hence, the aluminum should not exceed the soda content (32-44%) of the glass or about 60% of the network ions, whichever is smaller. A network former content of 60%, which occurs in a glass of 40% soda content, for example, is equivalent to about 36 cation percent in the glass.

Glasses in which boric oxide is the sole major network former are known (borate glasses), and have been proposed for membrane use. These glasses tend to be moisture sensitive, structurally unstable and have low viscosities and low melting temperature. The presence of sodium ion tends to impart a tetrahedral group form, $(BO_4)^-$, similar to that noted with alumina. However, this is effective only up to about 15% sodium. Hence, the amount of soda that can be usefully added to a borate glass for improved conductivity is limited, because of formation of non-bridging oxygen ions by direct bonding to sodium in excess of 15%. Furthermore, in the presence of both aluminum and boron, the former tends to displace the latter from tetrahedral sites with sodium nearby, and to force the boron into a threefold coordination. This causes a decrease in conductivity and viscosity.

Because of limits placed on the amount of Si and Al, boron is needed in the glass, in addition, to insure sharing oxygen with silicon, thus reducing the tendency for sodium metal corrosion. Moreover, boron is desirable where a glass of low melting temperature and/or low viscosity is desired. The main disadvantage of a high boron content is sensitivity to moisture. Thus, a sodium borate glass is water soluble, and rapidly hydrates in a humid atmosphere. The boron content then should be maintained in the range of 15-70% of the network cations, equivalent to 9-42% of a glass of 40% soda content.

SPECIFIC EMBODIMENTS

The invention is further described with reference to several specific illustrative glasses having compositions, calculated from the glass batch, as shown in Tables I and II. Compositions 1 to 6 in Table I correspond to network sites A, B, C, D, E, F in the ternary diagram of network formers shown in the FIGURE.

TABLE I

| NETWORK POSITION: | | A | B | C | D | E | F |
|---|---|---|---|---|---|---|---|
| Network Components: | | | | | | | |
| cation % | Al | 17.0 | 25.4 | 43.7 | 51.8 | 49.8 | 32.8 |
| | B | 53.0 | 59.7 | 39.1 | 28.1 | 20.1 | 37.1 |
| | Si | 30.0 | 14.9 | 17.2 | 20.1 | 30.1 | 30.1 |
| Glass Composition: | | 1 | 2 | 3 | 4 | 5 | 6 |
| cation % | Na | 39.5 | 38.6 | 41.2 | 41.2 | 41.2 | 41.1 |
| | Al | 10.2 | 15.6 | 25.7 | 30.5 | 29.3 | 19.3 |
| | B | 32.0 | 36.6 | 23.0 | 16.5 | 11.8 | 21.8 |
| | Si | 18.3 | 9.2 | 10.1 | 11.8 | 17.7 | 17.7 |
| weight % | $Na_2O$ | 30.9 | 31.4 | 31.9 | 31.0 | 30.1 | 31.2 |
| | $Al_2O_3$ | 13.1 | 20.8 | 32.8 | 37.7 | 35.1 | 24.1 |
| | $B_2O_3$ | 28.2 | 33.4 | 20.1 | 14.0 | 9.7 | 18.6 |
| | $SiO_2$ | 27.8 | 14.4 | 15.2 | 17.3 | 25.1 | 26.1 |
| Glass Properties: | | | | | | | |
| log-resistivity at 300° C. | | 4.00 | 4.20 | 4.22 | 4.00 | 3.93 | 4.07 |
| thermal expans., ppm/°C. | | 13.2 | 13.7 | 14.6 | 13.6 | 14.0 | 13.8 |
| annealing temperature, °C. | | 457 | 424 | 424 | 550 | 590 | 460 |
| softening temperature, °C. | | 550 | 514 | 545 | 680 | 720 | 548 |
| melting temp. at 10 poise | | 1023 | 967 | 1350 | 1420 | 1380 | 1120 |
| stability to moisture | | exc. | fair | good | good | good | exc. |

TABLE II

The effect of soda content in compositions based on network position A in Table I (Al-17.0, B-53.0, Si-30.0 ct %)

| Glass composition: | | 7 | 8 | 9 | 10 | 11 | 12 |
|---|---|---|---|---|---|---|---|
| cation % | Na | 35.0 | 36.5 | 38.1 | 39.5 | 41.0 | 42.5 |
| | Al | 10.9 | 10.7 | 10.4 | 10.2 | 10.0 | 9.8 |
| | B | 34.5 | 33.6 | 32.8 | 32.0 | 31.3 | 30.6 |
| | Si | 19.6 | 19.2 | 18.7 | 18.3 | 17.7 | 17.1 |
| weight % | $Na_2O$ | 27.0 | 28.3 | 29.6 | 30.9 | 32.3 | 33.6 |
| | $Al_2O_3$ | 13.8 | 13.6 | 13.4 | 13.1 | 12.9 | 12.7 |
| | $B_2O_3$ | 29.9 | 29.3 | 28.7 | 28.2 | 27.7 | 27.2 |
| | $SiO_2$ | 29.3 | 28.8 | 28.3 | 27.8 | 27.1 | 26.5 |
| Glass Properties: | | | | | | | |
| log-resistivity at 300° C. | | 4.98 | 4.49 | 4.20 | 4.00 | 3.84 | 3.73 |
| thermal expans., ppm/°C. | | 11.5 | 12.1 | 12.7 | 13.2 | 13.8 | 14.5 |
| annealing temperature, °C. | | 478 | 471 | 466 | 457 | 449 | 438 |
| softening temperature, °C. | | 562 | 561 | 557 | 550 | 539 | 523 |
| melting temp. at 10 poise | | 1083 | 1071 | 1050 | 1023 | 992 | 955 |

TABLE II-continued

The effect of soda content in compositions
based on network position A in Table I
(Al-17.0, B-53.0, Si-30.0 ct %)

| devitrification at 2°/min. | — | — | — | — | trace | yes |

Glasses corresponding to the compositions of Tables I and II were prepared in 400 gram batches by mixing suitably proportioned amounts of standard glass-making materials. These batches were then melted by holding for two hours in platinum crucibles in an electric furnace operating at temperatures as shown in the Tables. Typical batch materials were: 200 mesh sand, anhydrous boric acid, anhydrous borax, calcined alumina and sodium carbonate.

The compositions in Table I were formulated to contain a comparable soda level. While not precisely equal, the variations from 38.6 to 41.2 cation percent sodium are so small as to not be significant for present purposes. With sodium essentially constant, the relative proportions of the network forming ions, silicon, boron and aluminum, were varied to illustrate the property potentials of the invention. The glass compositions are presented in both cation percent and weight percent on an oxide basis. Also, certain relevant properties were measured on the glasses and are listed.

In general, the examples illustrate glasses of the entire system insofar as they are stable against phase separation and structural change due to shifts in the boron coordination number. Both these undesirable characteristics are occasioned by variations in temperature and cooling rates, and prevail in previously proposed borate and borosilicate glasses. The present glasses can also be chosen to be less prone to devitrification and hydration than prior aluminoborates.

As indicated, the glasses have relatively low resistivities suitable for battery electrolyte use. Further, they are generally stable against corrosive sodium attack.

Perhaps the most surprising property, for glasses with such high soda content, is their stability against moisture attack. This is particularly true for the glasses with higher silica content. It is well known, for example, that both sodium borate and sodium silicate glasses are water soluble. In contrast, some of the present glasses have excellent moisture resistance approaching that of the soda lime glass used for windows.

In other respects, however, properties differ, thus permitting selection for different manners of glass working, different manners of battery assembly, and different manners of glass sealing. In particular, a wide range of viscosity-temperature characteristics is available. For example, glasses 1 and 2 may be melted at temperatures on the order of 400° C. less than glasses 4 and 5. They also have widely different annealing temperatures, thereby permitting the use of various sealing conditions. Glass 3 is still different in that it has a high melting point, but low annealing temperature. This means that viscosity changes slowly with temperature, thereby providing a wide temperature range in which the glass can be worked.

The compositions shown in Table II represent a glass series based on network position A. They were formulated to illustrate the effect of soda content. Network position A of Table I was taken as a base. Then the relative cation relationships of the three network formers were held essentially constant, while the sodium content was varied over the permissible range. Within this range, composition 10 of Table II is the same as composition 1 in Table I.

Having reference to the FIGURE, the compositions of Table II may be thought of as spaced points along a line perpendicular to the page and representing cation percent of sodium from 32% to 44%. The several compositions represent actual sodium contents from 35% to 42.5%.

As the properties shown in Table II indicate, resistivity, viscosity, and coefficient of thermal expansion vary with soda content in predictable manner. Hence, soda content can also be used to tailor these properties for a specific application.

A very important factor, which must be considered for a particular article geometry and method of fabrication, is the maximum soda content that can be present without concern for devitrification. The condition stipulated in testing the present glasses was a cooling rate of 2° C./minute. Experience has shown this to be adequate for most processes used in drawing capillary tubing and thin ribbon glass. On the other hand, if ribbon glass is formed by rolling, the cooling rate can be faster, so that devitrification is less of a problem. In that case, Example 12 could be used if desired. That glass would not be satisfactory for tube drawing, whereas compositions 7-10 are adequate for that purpose.

It will be appreciated from the foregoing that a similar series of soda variations can be formulated and checked for devitrification tendencies for any network former relationship one may wish to select within the boundaries shown in the FIGURE. It is also apparent that the best mode will depend on the application involved. Furthermore, even in a specific application, or device design, the best glass will depend on specific operating conditions as well as component assembly procedures. Presently, the glass of Example 1 appears to offer a good overall combination of properties.

While my invention is described with respect to several specific examples, it will be understood that these are illustrative only and not limiting. Rather, numerous variations will become apparent and the invention should be understood as limited only by the conditions clearly stated in the claims which follow, and which define the several aspects of the invention.

I claim:

1. A sodium ion conducting glass having a resistivity not over $10^5$ ohm-cm at 300° C., being resistant to corrosive attack by liquid sodium and to devitrification, and being composed essentially of, as calculated from the glass batch in cation percent, 32–44% Na, and the remainder essentially a mixture of Si, B and Al wherein the Si content is 10–40% of the total Si+B+Al, the Al is 5–60% of such total, and the B is 15–70%.

2. A sodium ion conducting glass in accordance with claim 1 wherein the Si content is 12–33% of the total Si+B+Al.

3. A sodium ion conducting glass in accordance with claim 1 having a resistivity on the order of $10^4$ ohm-cm, being resistant to devitrification when cooled at a rate of 2° C./minute and containing 38–42 cation percent Na.

4. A sodium-sulfur battery having a liquid sodium anode, a liquid sulfur-sodium sulfide mixture as a cathode, and a thin glass membrane separating the anode and cathode liquids, the membrane being formed from a sodium ion conducting glass having a resistivity not over $10^5$ ohm-cm, being resistant to corrosive attack by liquid sodium and to devitrification, and being composed essentially of, as calculated from the glass batch in cation percent, 32–44% Na, and the remainder essentially a mixture of Si, B and Al wherein the Si content is 10–40% of the total Si+B+Al, the Al is 5–60% of such total, and the B is 15–70%.

5. A sodium-sulfur battery in accordance with claim 4 wherein the membrane glass has a Si content that is 12–33% of the total Si+B+Al content in cation percent.

6. A sodium-sulfur battery in accordance with claim 4 wherein the membrane glass has a resistivity on the order of $10^4$ ohm-cm, is resistant to devitrification when cooled at a rate of 2° C./minute, and contains 38–42 cation percent Na.

7. In a sodium-sulfur battery, a glass membrane formed from a sodium ion conducting glass having a resistivity not over $10^5$ ohm-cm, being resistant to corrosive attack by liquid sodium and to devitrification, and being composed essentially of, as calculated from the glass batch in cation percent, 32–44% Na, and the remainder essentially a mixture of Si, B and Al wherein the Si content is 10–40% of the total Si+B+Al, the Al is 5–60% of such total, and the B is 15–70%.

8. In the battery of claim 7, a glass membrane wherein the Si content in the glass is 12–33% of the total Si+B+Al content in cation percent.

9. In the battery of claim 7, a glass membrane wherein the glass has a resistivity on the order of $10^4$ ohm-cm, is resistant to devitrification when cooled at a rate of 2° C./minute, and contains 38–42 cation percent Na.

* * * * *